United States Patent [19]
Foster et al.

[11] Patent Number: 5,323,748
[45] Date of Patent: Jun. 28, 1994

[54] ADAPTIVE DILUTION CONTROL SYSTEM FOR INCREASING ENGINE EFFICIENCIES AND REDUCING EMISSIONS

[75] Inventors: Douglas Foster, Brighton; Edward A. VanDuyne, Framingham, both of Mass.

[73] Assignee: Massachusetts Institute of Technology, Cambridge, Mass.

[21] Appl. No.: 751,155

[22] Filed: Aug. 28, 1991

[51] Int. Cl.$^5$ .............................. F02M 7/00
[52] U.S. Cl. ..................... 123/435; 123/568
[58] Field of Search ............... 123/435, 425, 422, 493, 123/568; 73/35; 364/431.08

[56] References Cited

U.S. PATENT DOCUMENTS

| | | | |
|---|---|---|---|
| 4,700,684 | 10/1987 | Pischinger et al. | 123/568 |
| 4,993,338 | 2/1991 | Mitsumoto | 123/425 |
| 5,027,773 | 7/1991 | Shimomura et al. | 123/425 |
| 5,080,068 | 1/1992 | Sawamoto | 123/435 |
| 5,115,790 | 5/1992 | Kawamura | 123/568 |

*Primary Examiner*—Raymond A. Nelli
*Attorney, Agent, or Firm*—Reising, Ethington, Barnard, Perry & Milton

[57] ABSTRACT

An adaptive dilution mixture control system for internal combustion engines including an apparatus for measuring a combustion force within a combustion chamber communicating with an apparatus for calculating the real-time work output of the engine from the measured combustion force, and an apparatus for controlling the variable dilution of the fuel-air mixture delivered to the combustion chamber to achieve a desired work output, the controlling apparatus responsive to the real-time work output. The apparatus for controlling the variable fuel-air mixture dilution includes a compensator for comparing the real-time work output and other engine parameters to an adaptive optimizing control model, and calculating the desired work output. Also included is a fuel injection system, and an exhaust recirculation valve to vary the dilution of the fuel-air mixture to achieve the desired work output. The adaptive optimizing control model is adapted to change over time based on a change in engine conditions.

23 Claims, 3 Drawing Sheets

ADAPTIVE DILUTION CONTROL SYSTEM FOR INCREASING ENGINE EFFICIENCIES AND REDUCING EMISSIONS

BACKGROUND OF THE INVENTION

This invention relates to a dilution control system that utilizes closed-loop adaptive control based on real-time engine work output to increase engine efficiencies and reduce emissions.

Control of internal combustion engines is currently premised on the reading of various engine operating parameters such as engine speed, intake manifold pressure, coolant temperature, throttle position, and exhaust oxygen concentration. These parameters are used in conjunction with specific, predetermined base maps calibrated by a baseline engine to select the ignition timing, fuel injector duration, and exhaust gas recirculation ("EGR") of the engine so that the engine achieves maximum efficiency and minimum emissions as determined by the baseline engine.

Base map control is simple and can be very effective for new engines. This control, however, has drawbacks as the engine ages and deposits build up in the combustion chambers and on the valves. More importantly, with emissions standards now requiring an automobile to remain within strict emissions limits for at least the first 100,000 miles, base map control cannot maintain the engine at or near its maximum efficiency and minimum emissions operating point for the required mileage.

Many experimental engine control systems use base map control to vary fuel-air mixture dilution, which reduces emissions. However, due to the complexities of running an engine heavily diluted, these control systems are not capable of maintaining maximum efficiency. For this reason, these systems often sacrifice maximum efficiency to maintain the low emissions required for at least the first 100,000 miles.

The current strict emissions standards require engine control systems to improve engine efficiencies of internal combustion engines. Research indicates that to increase such efficiencies, internal combustion engines must operate with a fuel-air mixture heavily diluted with excess air, exhaust gases, or a combination of both. This produces more efficient combustion, while also reducing pumping losses at part throttle conditions. The current strict emissions standards also require that internal combustion engines meet the emissions criteria for at least the first 100,000 miles. Therefore, an engine control system adaptable to changing engine conditions over the life of the engine is needed so that the engine can operate at maximum efficiency and minimum emissions for at least the first 100,000 miles.

Present engine control systems, and more specifically, dilution control systems, do not adequately control internal combustion engines so that maximum efficiency and reduced emissions are achieved for the required mileage. For example, U.S. Pat. No. 4,543,934 provides a fuel-air mixture dilution control system by monitoring cycle-to-cycle fluctuations of the angular position of peak combustion pressure of each engine cylinder. This control system determines an air/fuel ratio at which engine stability changes between stable and unstable conditions. A controller attempts to continuously operate the engine at the engine stability point, leaning the fuel-air mixture until the engine becomes unstable, and enriching the fuel-air mixture until the engine becomes stable again. This stability point is often beyond the point of maximum efficiency and is often also beyond the point of minimum emissions.

Other control systems, such as the system disclosed in U.S. Pat. No. 4,736,724, control the air/fuel ratio by measuring the burn duration of each engine cylinder. The duration is compared to an adaptive engine map that determines the lean limit for the engine at a specific speed and load. The engine is then controlled to operate at the most dilute point possible for a desired engine stability, but this point is often beyond the point of maximum efficiency, and is often beyond the point of minimum emissions.

U.S. Pat. No. 4,621,603 discloses three different methods of controlling the level of fuel-air mixture dilution using pressure ratio management. The first system controls the amount of diluent at a specified value as a function of engine speed and load. The second system controls the amount of diluent to adjust the burn rate or combustion time. The third system controls the amount of diluent using cycle-to-cycle variability as both a method to balance fuel delivery to each combustion chamber, and as a method of stability control. Pressure ratio management allows for a simplified algorithm, but does not supply the engine controller with enough information for complete engine control because taking pressure readings only at specific points allows the controller only to estimate engine stability, and therefore, this system suffers the same limitations of the previously mentioned systems.

Alternatively, the system of U.S. Pat. No. 4,621,603 could be used at a specific air/fuel ratio that is calculated according to base maps, but even with an adaptive algorithm, the pressure ratio does not give enough information to allow the system to provide both maximum efficiency and minimum emissions for at least the first 100,000 miles. The system in U.S. Pat. No. 4,621,603, for example, would have extreme difficulty calculating the engine mean effective pressure if spark timing varies by large amounts. Such a calculation is necessary for an engine to achieve maximum efficiency at highly dilute mixtures and minimum emissions for at least the first 100,000 miles.

SUMMARY OF THE INVENTION

The closed-loop adaptive dilution mixture control system for an internal combustion engine comprises an apparatus for measuring a combustion force within at least one combustion chamber, such as a pressure sensor, the measuring apparatus communicating with an apparatus for calculating the real-time work output of the engine from the measured combustion force, and an apparatus for controlling a variable dilution of the fuel-air mixture delivered to the combustion chamber to achieve a desired work output, the controlling apparatus being responsive to the real-time work output. The real-time work output of the engine can be most accurately estimated by calculating the indicated mean effective pressure ("IMEP") of the combustion chamber by using pressure sensor data.

The apparatus for controlling the variable dilution of the fuel-air mixture includes a compensator for comparing the real-time work output and a plurality of other engine parameters to an adaptive optimizing control model, and calculating the desired work output based on the real-time work output and other engine parameters. The compensator also calculates the fuel-air mixture dilution required to achieve the desired work output. The apparatus for controlling the variable dilution of the fuel-air mixture also includes a fuel injector system and an EGR valve to provide the required fuel-air mixture dilution as determined by the compensator.

The real-time work output and other engine parameters are also fed into a parameter filter which analyzes the inputs and calculates compensator performance data. If the compensator is operating below an acceptable level, the adaptive optimizing control model is adjusted for the change in engine conditions due to factors, for example, such as weather, altitude, and engine wear. The adaptive optimizing control model allows the dilution control system to operate the engine at maximum efficiency and reduced emissions for at least a first 100,000 miles of a vehicle.

DESCRIPTION OF THE PREFERRED EMBODIMENT

Figure 1:
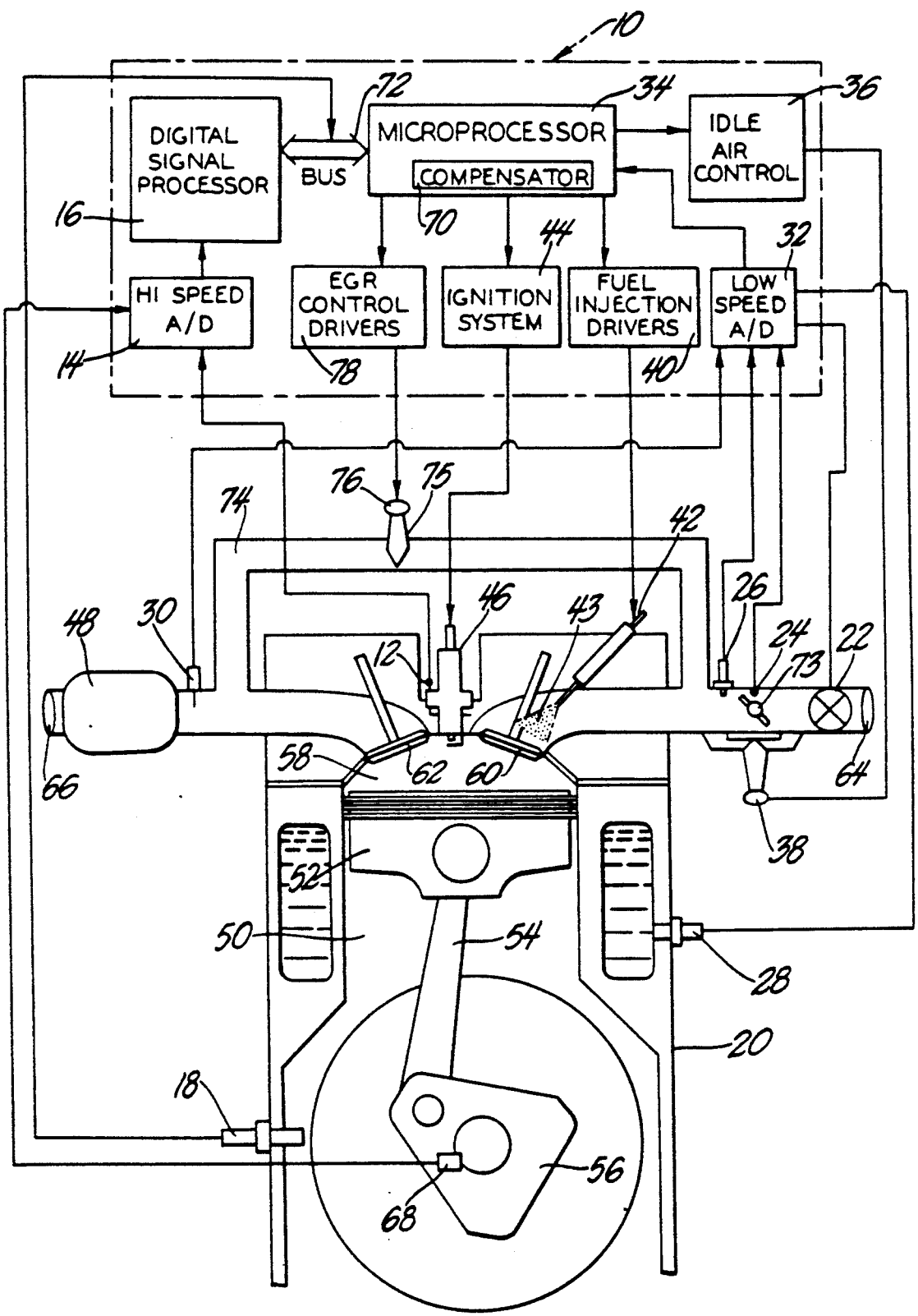
FIG. 1 is a schematic front view of the adaptive dilution control system of the invention.

As shown in FIG. 1, the adaptive dilution control system 10 of the invention controls the dilution of the fuel-air mixture 43 delivered to an internal combustion engine 20 generally comprising at least one cylinder 50 having a reciprocating piston 52 attached to a connecting rod 54, actuating a crankshaft 56. The piston 52 and cylinder 50 form a combustion chamber 58 having at least one intake valve 60 intermittently connecting the combustion chamber 58 to an intake manifold 64. A swirl control valve (not shown) may also be included in the intake stream of the fuel-air mixture 43 so that precise control of combustion chamber swirl and an increase in the dilution limit of the engine 20 may be achieved. More specifically, increased swirl at low speeds and engine loads allows for more efficient mixing of the fuel-air mixture 43, and thus more efficient combustion of dilute mixtures.

The combustion chamber 58 also includes at least one exhaust valve 62 intermittently connecting the combustion chamber 58 to an exhaust manifold 66, which may include a wide band exhaust oxygen sensor 30 for measuring air/fuel ratio in addition to simplifying warm-up or limp-home modes. The combustion chamber 58 is further equipped with a spark plug 46, and the intake manifold 64 is further equipped with a fuel injector 42, such as a fuel atomizer or an ultrasonic fuel injector. The engine may also include an exhaust gas catalyst 48, such as a three-way catalyst, disposed within the exhaust manifold 66 to assist the control system 10 in reducing emissions.

The adaptive dilution control system 10 of the invention includes an apparatus for measuring the combustion force within the combustion chamber 58, communicating with an apparatus for calculating the real-time work output of the engine 20, and an apparatus for controlling the variable dilution of the fuel-air mixture 43 delivered to the combustion chamber 58, the controlling apparatus responsive to the real-time work output.

Each of these components are more fully described below.

Figure 2:
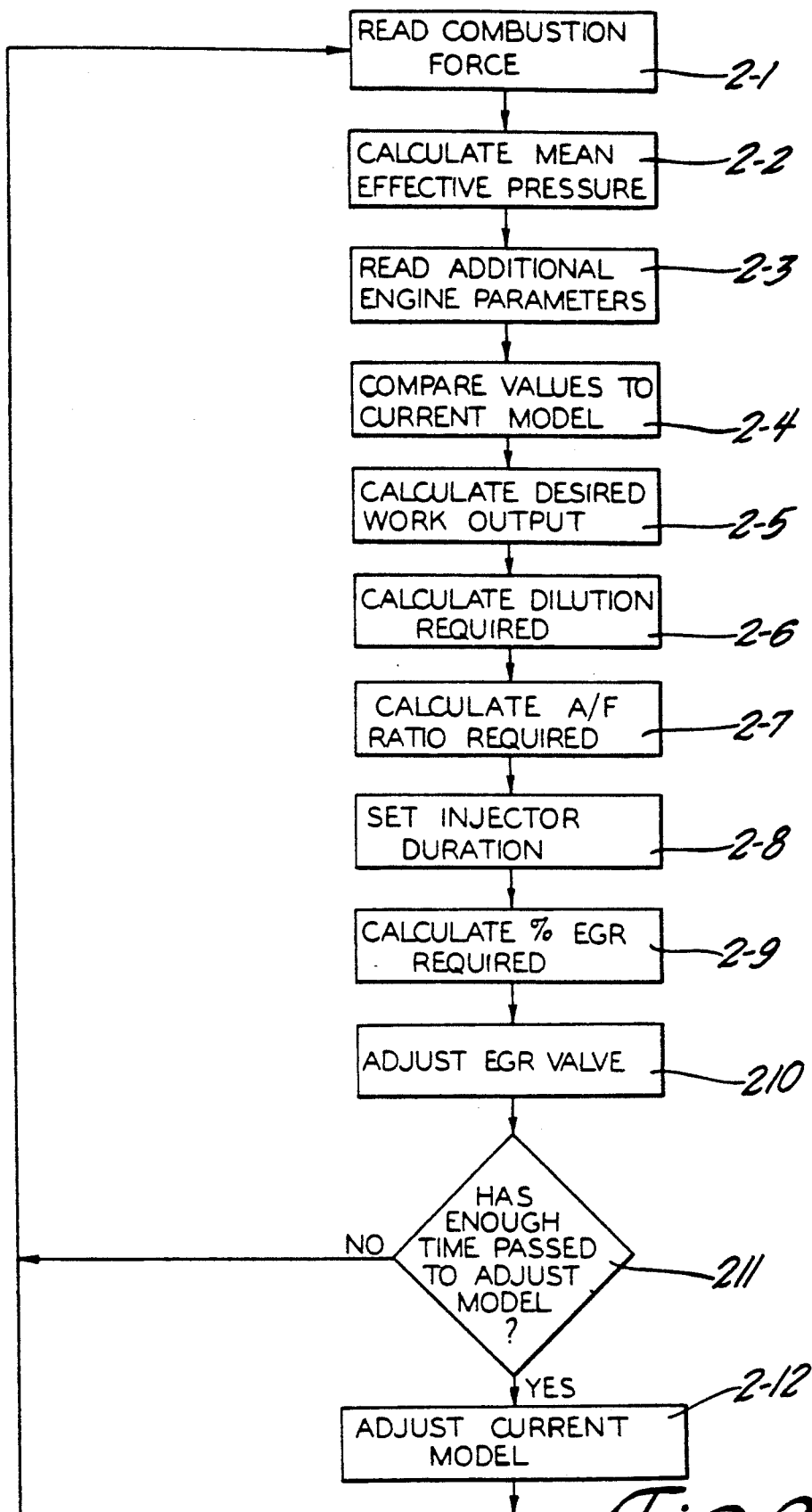
FIG. 2 is a flow chart depicting the operation of the adaptive dilution control system.

The operation of the adaptive dilution control system 10 is depicted in the flow chart of FIG. 2. Step 2-1 requires the measurement of the combustion force by the measuring apparatus, such as a pressure sensor 12 shown in FIG. 1. The pressure sensor 12 may be, for example, a spark plug ring-type pressure sensor or a port mounted pressure sensor. The combustion force may be measured by the pressure sensor 12 at each power stroke of piston 52 or at every certain number of power strokes of piston 52.

A plurality of pressure signals from the pressure sensor 12 are fed into the high-speed analog to digital converter 14 of the control system 10 and the resulting signal is read by the apparatus for calculating the real-time work output of the engine, such as a digital signal processor ("DSP") 16. The DSP uses the signals from the converter 14 and any additional signals received from a high-accuracy crankshaft encoder 18, when such an encoder device is included in the engine 20, to calculate the indicated mean effective pressure ("IMEP") of the combustion chamber 58, as required by Step 2-2. IMEP is an accurate approximation of the real-time work output of the engine 20. The DSP 16 also uses pressure sensor 12 signals to detect engine knock, misfire, and peak pressure position data.

The DSP 16 calculates the IMEP by using the equation $$IMEP = \int (Pdv)$$

where P is combustion chamber 58 pressure and dv is the change in combustion chamber 58 volume. Alternatively, the DSP 16 can calculate the real-time work output of the engine by calculating the mean effective pressure ("MEP") of the combustion chamber 58, by using a plurality of torque readings from a torque sensor 68 using the equation $$MEP = 2\pi T/Vd$$

assuming a 4-stroke engine, where T is the engine torque, and Vd is the displaced volume of the engine.

The combustion force can also be measured by a speed fluctuation sensor (not shown, but similar to the crankshaft encoder 18) and a plurality of its readings can be used to calculate the MEP of the engine 20 by the equation $$MEP \propto I \left( \frac{\Delta \omega^2}{2} \right) / Vn$$

where I is the engine inertia, $\Delta \omega$ is the fluctuation in engine speed and Vn is the stroke displacement.

Additional engine sensors are included in the adaptive control system 10 of the invention. For example, these sensors may include an air mass flow sensor 22, intake manifold absolute pressure sensor 26, engine coolant temperature sensor 28, and exhaust gas oxygen sensor 30. A special accelerator pedal position sensor 24 can also be included to provide driver inputs beyond wide open throttle when the engine 20 operates at a highly dilute fuel-air mixture. The accelerator pedal position sensor allows the control system 10 to reduce dilution and provide increased power output by allowing a richer fuel-air mixture into the combustion chamber 58. The accelerator pedal position sensor would be more responsive if the throttle 73 was replaced by a microprocessor controlled "fly-by-wire" system, including the accelerator pedal position sensor 24 and a throttle plate controller (not shown), which is well known in the automobile industry. Signals from sensors 22-30 are read through a low-speed multiplexed analog to digital converter 32 and fed into a microprocessor 34 of the control system 10, as required by Step 2-3 of FIG. 2.

The microprocessor 34 uses these sensor signals to control an idle air control driver 36 and an air valve 38, the fuel injector driver 40 and a fuel injector 42, and the ignition system 44 and at least one spark plug 46. The ignition system 44 may be a high powered ignition system that would allow for a more complete ignition of highly dilute fuel-air mixtures. Such an ignition system could also optimize spark timing to provide maximum brake torque timing or peak pressure at approximately fifteen degrees after top center of the piston 52 to further optimize combustion. The micro processor 34 also controls flow of exhaust gas through an exhaust gas recirculation manifold 74, using an EGR driver 78, and EGR motor 76, to accurately adjust the EGR valve 75.

The apparatus for controlling the variable dilution of the fuel-air mixture includes a compensator 70 for comparing the real-time work output, accurately approximated by IMEP or MEP, of the engine 20 and additional engine parameters, as read by sensors 22-30, via the microprocessor bus 72, to an adaptive optimizing control model programmed into the compensator 70, as shown by Step 2-4 of FIG. 2. The adaptive optimizing control model is dependent upon the type of vehicle (not shown) utilizing the adaptive control system 10 and is achieved through experimentation with such type of vehicle to determine the optimum operating parameters for maximum engine efficiencies and minimum emissions.

More specifically, the compensator 70, in conjunction with the adaptive optimizing control model, calculates the required dilution by utilizing predetermined efficiency and stability coefficients. The efficiency coefficient ("EC") is used to make decisions regarding tradeoffs between engine efficiency and minimum emissions. The stability coefficient ("SC") is used to make decisions as to the extent that desired work output can be reduced while maintaining driveability of the vehicle. Both coefficients are mapped within the adaptive optimizing control model in a speed-load matrix to allow each coefficient to be varied at different engine operating points.

The SC is determined using empirical data from base line testing of the particular engine incorporating the control system 10. For example, the SC is based upon the coefficient of variation (COV) of IMEP. Thus, COVimep (%) = standard deviation of (IMEP)/mean (IMEP) × 100.

Typically, as the dilution of the fuel-air mixture is increased, the COV increases. This is tolerable until the COV exceeds approximately 5 to 10 percent. It is well known in the automotive industry that as the EGR rate increases, the COV increases at both moderate and fast burn rates. In addition, as EGR is increased, NOx emissions are reduced, but eventually the selected operating limit or limits are reached. The value used for the SC will initially be set to a minimum value to obtain the best possible stability and driveability. As the compensator 70 is tested, the SC value may need to be varied to allow for further reductions in NOx emissions at certain operating points.

The EC for the control system 10 is a ratio from 1.0 to 0.0, where 1.0 instructs the compensator 70 to maximize efficiency by diluting only with excess air, and a value of 0.0 instructs the compensator 70 to minimize emissions by dilution with only exhaust gas. The EC is initially set at 1.0, and as the compensator 70 is tested, the EC value may need to be decreased so that the control system 10 may further reduce emissions at certain operating points.

Obtaining the proper adaptive optimizing control model, stability coefficients, and efficiency coefficients to pass federal emissions requirements for at least the first 100,000 miles requires testing of specific engine and drivetrain combinations. However, with proper research, it is possible to develop an adaptive optimizing control model that could adapt to different engines and drivetrains.

Step 2-5 of FIG. 2 shows that the compensator 70 then calculates the desired work output, or desired IMEP or MEP, that meets the desired emissions and efficiency criterion associated with the calculated IMEP or MEP, and other engine parameters read by sensors such as engine sensors 22-30. After the desired work output is calculated, the compensator 70 calculates the dilution and the air/fuel ratio required to achieve the desired work output, as shown in Steps 2-6 and 2-7. Step 2-8 indicates that the compensator 70 of the microprocessor 34 sends a signal to the fuel injection drivers 40 to set the fuel injection duration necessary for the desired work output. If additional dilution is required, as shown in Step 2-9, the compensator 70 of the microprocessor 34 will send a signal to the EGR driver 78 to adjust the EGR valve 75, as described in Step 2-10, so as to allow the necessary exhaust into the intake manifold 64. It is noted that fuel-air mixture dilution may be accomplished by either adjusting the fuel injector 42 or the EGR valve 75, or both.

Further efficiencies and reduced emissions can also be achieved by using stepper motor control of the EGR valve 75 to provide precise EGR metering. And, the microprocessor 34 can also calculate fuel consumption for increased engine optimization. A lean combustion oxygen sensor 30 may be included in the control system 10 to confirm the changes in dilution and to provide a back-up control for fuel-air mixture dilution in the event of compensator 70 failure.

To maintain maximum efficiency for a specific engine load the compensator 70 will increase the air/fuel ratio as needed. If further reductions in NOx are required, as determined by the compensator 70, EGR will be increased via EGR valve 75. If the IMEP of the engine becomes erratic, or reduces to less than zero, then misfire is occurring due to high levels of dilution. At that point the dilution must be reduced to maintain proper driveability of the vehicle. For specific engine load conditions, it may not be possible to provide the desired work output with a lean air/fuel ratio due to lack of driveability. At that point the compensator 70 will return the fuel-air mixture 43 to a stoichiometric mixture and adjust dilution only with EGR. As maximum work output is required, EGR will be reduced to a minimum or zero level. To maintain low emissions at all times, it may be necessary to reduce the maximum work output of the engine by continuously maintaining a dilute mixture.

Figure 3:
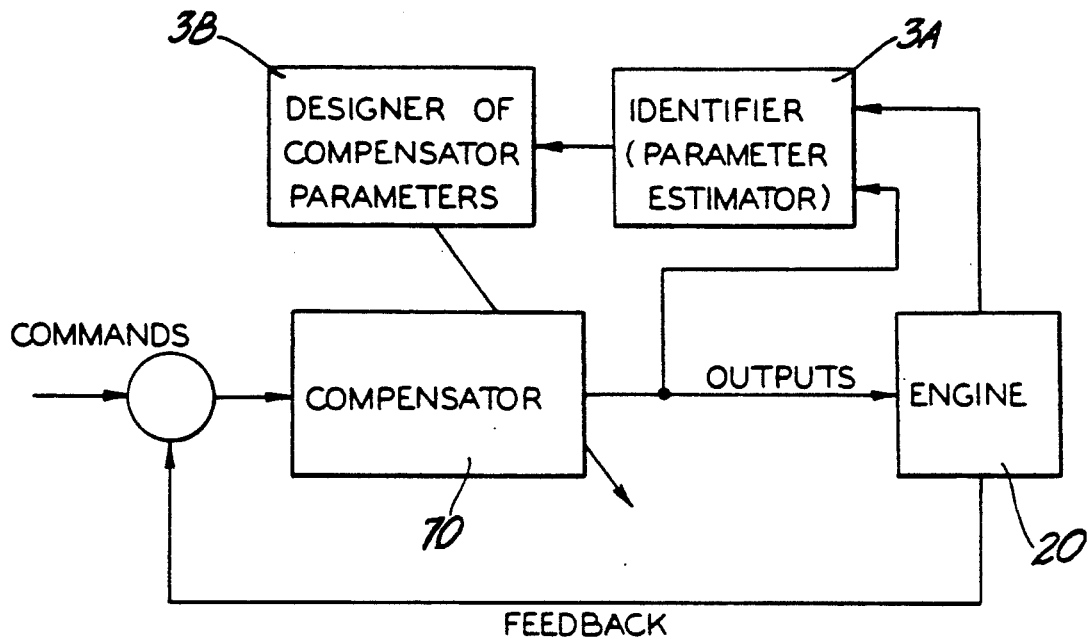
FIG. 3 is another schematic view of the adaptive dilution control system.
Figure 4:
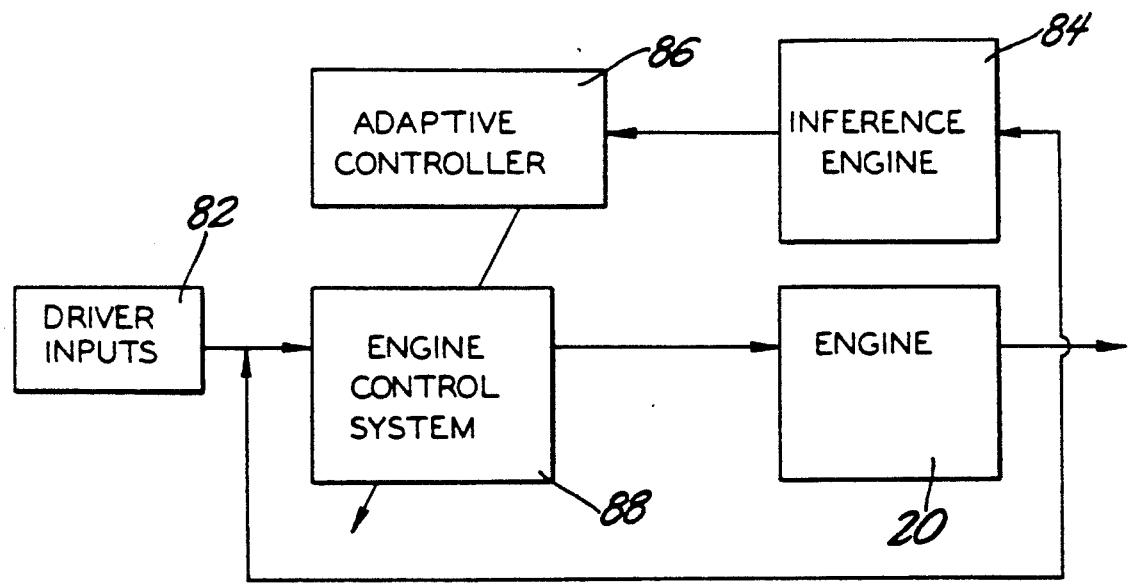
FIG. 4 is a block diagram of a subroutine describing the adaptive optimizing control.

Sensor signals from engine sensors 22-30 are also continuously fed into a parameter filter, or parameter estimator 3A, as shown in FIG. 3. This filter 34 analyzes the sensor inputs and calculates compensator performance information, such as compensator response time, system error, and system stability. Step 2-11 of FIG. 2 requires that if this information indicates a decrease in compensator 70 performance below a predetermined acceptable level, the control model of the compensator 70 is adjusted at Step 2-12 by the designer of compensator parameters 3B, as shown in FIG. 3, so that the engine 10 can deliver the desired work output for at least the first 100,000 miles. The filter 3A also monitors the engine 20 for erratic performance and can inform engine diagnostic warning systems (not shown) of any irregularities.

A driver input 82, typically, accelerator pedal position sensor 24, together with feedback from engine sensors 22-30 are used to control the engine 29. Engine sensors 22-30 are also used by an inference engine 84 to measure performance characteristics of the engine 20, including driveability, fuel economy, emissions and torque output. The performance characteristics are used by an adaptive controller 86 to modify the control scheme of an engine control system 88 to provide the desired engine performance.

Calculating the fuel-air mixture dilution necessary to achieve the required engine efficiencies and reduced emissions, and calculating the percentage of EGR and air/fuel ratio needed to provide that dilution, is essential to the operation of the engine within the current emission standards for at least the first 100,000 miles. It is well known in the automobile industry that maximum reduction in emissions, when using a three-way catalyst, is achieved when an engine operates at an air/fuel ratio as close to stoichiometry as possible. However, minimum fuel consumption occurs at an air/fuel ratio greater than that of a stoichiometric mixture, and at lean operating conditions a three-way catalyst, or a less expensive oxidation catalyst, is very efficient at oxidizing HC and CO emissions, but very inefficient at reducing NOx emissions, for the primary reason that the formation of NOx emissions is dependent mainly on high temperatures and high oxygen concentrations.

In addition to air, dilution of the fuel-air mixture can be accomplished with many other gasses. More specifically, the dilution of the fuel-air mixture with an inert gas reduces the temperatures reached after combustion by increasing the heat capacity of the fuel-air mixture. Exhaust gas, primarily comprising nitrogen, has a higher heat capacity than air, and therefore, diluting the fuel-air mixture with exhaust gas reduces NO production more effectively than an equivalent dilution of air. Diluting with air, however, increases the oxygen concentration in the combustion chamber 58, and thus, increases the overall combustion efficiency. Therefore, diluting with air provides a larger increase in fuel efficiency than diluting with only EGR.

The dilution of the fuel-air mixture is commonly measured by using a gas/fuel ratio (G/F), whereby G/F is the total mass of the gases in the combustion chamber 58 divided by the fuel mass in combustion chamber 58. More specifically, $$G/F = A/F(1 + Xb(1 - Xb))$$

where A/F is the air/fuel ratio of the fuel-air mixture, and Xb is the burned gas fraction equal to the mass of EGR in the combustion chamber 58 plus the residual mass of the gases in the combustion chamber 58 divided by the total mass of the gases in the combustion chamber 58. The compensator 70 utilizes this G/F ratio to calculate the desired dilution. Determining the proper amounts of EGR and air/fuel ratio necessary to produce the desired fuel-air mixture dilution requires a tradeoff between minimum NO and HC emissions, and maximum fuel economy.

Dilution of the fuel-air mixture reduces the total amount of fuel available at each combustion event. The power output available from the engine 20 is directly related to the amount of fuel in the combustion chamber 58 and the overall combustion efficiency. For a specific engine speed-load condition, as dilution increases, more fuel-air mixture 43, otherwise known as intake charge is required to achieve the same power output as a non-diluted fuel-air mixture. Therefore, a wider throttle 73 setting must be used to achieve this increase in charge. The net result is a reduction in pumping losses, which results in an increase in total fuel efficiency.

A prototype of the dilution control system of the invention has been used in automotive engine performance evaluations at steady state operating conditions. The engine used for these studies was a Chevrolet 4.3 liter V-6 spark ignition engine with throttle body injection. It was found that at moderately lean air/fuel ratios approximating 21:1, optimal fuel consumption was observed. The studies also indicated that if the dilution control strategy is optimized for maximum fuel efficiency, without regard to emissions, it is possible that the fuel consumption can be reduced over an engine operating at stoichiometric by approximately 10% on average, depending on the initial engine performance. This reduction in fuel consumption may be even greater if the dilution control system is optimized for a limited speed and load range experienced by, for example, generator engines. And, if the dilution control system is optimized for low NOx emissions, it is possible that current emission levels (1 g NOx/mi, 0.41 g HC/mi, and 3.4 g CO/mi) can be achieved while obtaining an improvement in efficiency of approximately 3% to 5%

What is claimed is:

1. An adaptive dilution control system for an internal combustion engine to reduce emissions and increase engine efficiencies, the system comprising an apparatus for measuring a combustion force within at least one combustion chamber, said measuring apparatus communicating with an apparatus for calculating a real-time work output of the engine function of the measured combustion force, and an apparatus for controlling variable dilution of a fuel-air mixture delivered to the combustion chamber to achieve a selected work output, the apparatus for controlling the variable dilution of the fuel-air mixture including a compensator having an adaptive optimizing control model, the compensator comparing a plurality of engine parameters including the real-time engine work output measured by at least one engine sensor with the adaptive optimizing control model and calculating the selected work output based on the real-time output and the engine parameters, the controlling apparatus thereby being responsive to the calculated real-time work output of the engine.

2. The adaptive dilution control system of claim 1 wherein the apparatus for measuring the combustion force includes a pressure sensor communicating with the combustion chamber of the engine.

3. The adaptive dilution control system of claim 2 wherein the apparatus for calculating the real-time work output of the engine uses a plurality of cylinder pressure readings measured by the pressure sensor to calculate the indicated mean effective pressure of the engine.

4. The adaptive dilution control system of claim 1 wherein the apparatus for measuring the combustion force includes an engine torque sensor.

5. The adaptive dilution control system of claim 4 wherein the apparatus for calculating the real-time work output of the engine uses a plurality of engine torque readings measured by the engine torque sensor to calculate the mean effective pressure of the engine.

6. The adaptive dilution control system of claim 1 wherein the apparatus for measuring the combustion force includes a speed fluctuation sensor.

7. The adaptive dilution control system of claim 6 wherein the apparatus for calculating the real-time work output of the engine uses a plurality of speed fluctuation readings measured by the speed fluctuation sensor to calculate the mean effective pressure of the engine.

8. The adaptive dilution control system of claim 1 wherein the apparatus for calculating the real-time workout of the engine includes a digital signal processor.

9. The adaptive dilution control system of claim 1 wherein the apparatus for controlling the variable dilution of the fuel-air mixture includes a fuel injection system which reduces a fuel flow so as to dilute the fuel-air mixture entering the combustion chamber with excess air.

10. The adaptive dilution control system of claim 1 wherein the apparatus for controlling the variable dilution includes an exhaust gas recirculation valve so that exhaust gases may be introduced into the combustion chamber to dilute the fuel-air mixture.

11. The adaptive dilution control system of claim 1 wherein the optimizing control model of the compensator is adapted to change over time based on a plurality of changing engine sensor measurements as interpreted by a parameter filter.

12. The adaptive dilution control system of claim 1 further including an accelerator pedal position sensor for receiving a driver command for an increased engine power output beyond an engine power output available at a wide open throttle plate position whereby the increased engine power output is achieved by allowing a richer fuel-air mixture into the combustion chamber.

13. The adaptive dilution control system of claim 9 wherein the fuel injection system includes a fuel atomizing device.

14. The adaptive dilution control system of claim 1 further including an apparatus for adjusting ignition timing.

15. The adaptive dilution control system of claim 1 further including a high power ignition system.

16. The adaptive dilution control system of claim 1 further including apparatus for calculating a coefficient of variation in desired work output to determine a limit of dilution allowed for maintaining driveability.

17. The adaptive dilution control system of claim 2 wherein the pressure sensor includes a spark plug ring-type pressure sensor.

18. The adaptive dilution control system of claim 2 wherein the pressure sensor includes a port mounted pressure sensor.

19. The adaptive dilution control system of claim 1 wherein the apparatus for calculating the real-time work output includes a crankshaft encoder.

20. The adaptive dilution control system of claim 1 further including a lean combustion oxygen sensor to confirm the changes in dilution and to provide a back-up control for fuel-air mixture dilution in the event of failure of the apparatus for controlling the variable dilution.

21. The adaptive dilution control system of claim 1 further including an apparatus for calculating the fuel efficiency of the engine.

22. The adaptive dilution control system of claim 1 wherein
the combustion chamber includes a reciprocating piston having a power stroke whereby
the combustion force is measured at each power stroke.

23. The adaptive dilution control system of claim 1 wherein
the combustion chamber includes a reciprocating piston having a power stroke whereby
the combustion force is measured once every certain number of power strokes.

* * * * *